United States Patent Office 3,247,255
Patented Apr. 19, 1966

3,247,255
BORON-CONTAINING COMPOUNDS
Joseph J. Dvorak, Denville, and Daniel Grafstein, Morristown, N.J., assignors to Thiokol Chemical Corporation, Bristol, Pa.
No Drawing. Filed Mar. 28, 1963, Ser. No. 269,837
10 Claims. (Cl. 260—606.5)

The present invention relates to novel compounds containing boron and to methods for making the same.

In recent years, there has been considerable interest in boron-containing compounds because the high heat of combustion of these compounds adapts them to use for rocket fuel. According to the present invention, boron compounds have been prepared, which compounds are useful for the preparation of polymers that have exceptional value as propellant binders. Moreover, the compounds of the present invention are themselves useful as high-energy fuels and as fuel additives, or as intermediates for the preparation of such fuels and additives. Solid products of this invention, either per se or after-formation into a polymer, can be used as solid propellants for rocket power plants and other jet-propelled devices when mixed with suitable oxidizers such as ammonium, potassium, or sodium perchlorates, ammonium nitrate, etc. Such propellant mixtures are compounded by a number of techniques known to the art. For example, the mixtures may comprise from 5 to 35 parts by weight of boron-containing materials and from 65 to 95 parts by weight of solid oxidizing agents mixed therewith. In some cases the propellant may also be made by combining the boron-compounds and oxidizers with a curable polymer, for example, of the polyethylene, polyurethane, polyester, or polyether types.

Of particular interest is the formation of excellent thermally stable polymers from the products of the present invention.

Other products of the invention may be used as additives in high energy liquid fuels by mixing the product with combustible liquids such as compatible hydrocarbon fuels.

The boron-containing compounds of the invention may all be considered derivatives of carborane, which is a compound of carbon, hydrogen, and boron, having the empirical formula $C_2H_{12}B_{10}$. Carborane is a solid material melting at 287°–288° C. It is characterized by a surprisingly stable nuclear structure and two labile hydrogen atoms, one connected to each carbon atom. It may be conveniently represented by the formula H$\theta$H. While there is some difference of opinion as to the molecular structure of carborane, its stability is usually attributed to a basket-shaped molecular configuration in which the ten boron atoms and two carbon atoms may be arranged at the apices of an icosahedron.

The products of the present invention may be conveniently prepared by the reaction of formaldehyde with the lithium salt of a bis(carboranylalkyl)ether or by the reduction of a bis(12-carboxy-11-carboranylalkyl)ether.

In the first method, the lithium salt of a bis(carboranylalkyl)ether is reacted with formaldehyde, conveniently added to the reaction mixture in the form of paraformaldehyde, to form a lithium ether alcoholate. When this alcoholate is hydrolyzed, for example by acidification of the reaction mixture, a compound is formed which has the following formula:

$$HOCH_2\theta R_1 O R_2 \theta CH_2 OH$$

where $R_1$ and $R_2$ are alkylene groups, suitably alkylene groups having 1–4 carbon atoms.

The following reactions illustrate the procedure taught above:

$$Li\theta R_1 O R_2 \theta Li + HCHO \rightarrow Li\theta CH_2 \theta R_1 O R_2 \theta CH_2 OLi$$
$$LiOCH_2 \theta R_1 O R_2 \theta CH_2 OLi + 2H^+ \rightarrow (HOCH_2 \theta R_2)_2 O + 2Li^+$$

The symbol $\theta$ represents the group $C_2H_{10}B_{10}$ which may also be represented as

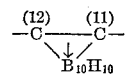

with the carbon atoms numbered 12 and 11 as shown and delocalized $\pi$-bonding as indicated between the carbon and boron atoms.

The product is a bis(11-hydroxymethyl-12-carboranylalkyl)ether.

In the second method for the production of the products of the present invention, a bis(11-carboxy-12-carboranylalkyl)ether is reduced in the presence of lithium aluminum hydride or other equivalent reducing agents to form a lithium ether alcoholate which may subsequently be hydrolyzed, for example by acidifying the reaction mixture, to yield a bis(11-hydroxymethyl-12-carboranylalkyl)ether.

The following reactions illustrate the procedure taught above:

$$HO_2C\theta R_1 O R_2 \theta CO_2H + LiAlH_4 \longrightarrow$$
$$LiOCH_2\theta R_1 O R_2 \theta CH_2 OLi \xrightarrow{H^+} HOCH_2\theta R_1 O R_2 \theta CH_2 OH$$

The reaction between a bis(12-lithium-11-carboranylalkyl)ether and formaldehyde to form a bis(12-hydroxymethyl-11-carboranylalkyl)ether according to the first method disclosed herein proceeds slowly at room temperatures (20°–30° C.), but is preferably carried out at temperatures up to 100° C. or 200° C., but below the decomposition point of the reagents and products, to make the rate of reaction economically feasible. The reaction may proceed between the reactants directly, or in solution in an organic solvent inert to the reaction. Conventional aliphatic, cycloaliphatic, aromatic hydrocarbon and oxygenated solvents such as benzene, toluene, cyclohexane, hexane, heptane, dioxane, ethers, etc. can be employed, as will be evident to the skilled organic chemist.

As mentioned, formaldehyde is conveniently used in the form of paraformaldehyde, but this use is not critical, and monomeric formaldehyde or other decomposable polymers of formaldehyde can be employed.

The reaction between a reducing agent such as lithium aluminum hydride and bis(12-carboxy-11-carboranylalkyl) ethers according to the second method disclosed herein proceeds at room temperatures. Lower temperatures (e.g., 0° C.) can be employed for better control of the reaction, or elevated temperatures up to 50° C. or 80° C. may be employed for faster reaction. The reaction is conveniently performed in solution, employing an inert organic solvent such as those earlier mentioned.

In all cases, the reactants are suitably maintained in contact for a time permitting substantially complete reaction. The reaction time is not critical, and will vary with the reaction temperature concentration, etc., as is usual in chemical reactions.

The preparation of the bis(11-carboranyl)ether reactants for either of the applicants' methods is disclosed in the co-pending Fein et al. application Serial No. 269,848 filed March 28, 1963. Briefly, in the preparation, an acetylenic ether is reacted with a co-ordination compound of decaborane and a material such as ethyl sulfide or acetonitrile. This co-ordination compound is suitably formed by reacting two moles of ethyl sulfide or acetonitrile, which are basic materials in the sense that they can donate electrons to aid formation of a chemical bond, with decaborane. This latter reaction is suitably carried out in an inert solvent medium such as one consisting of one-half dioxane and one half toluene. The acetylenic ether is conveniently added to the solution of the co-ordination compound any synthesis of the bis(11-carboranyl)ether is carried out directly in the same solvent medium.

The acetylenic ether and the bis(carboranyl-alkyl) ether reaction product may be symmetrical or asymmetrical. Ethers with straight aliphatic chains are preferred over those with excessively branched chains because of the greater probability of steric hindrance of the reactions with the latter materials. Bis(carboranyl-alkyl)ethers derived from diacetylenic ethers with lower alkyl chains having from 1 to 4 carbon atoms are particularly suitable for use in the present invention and bis(11-carboranylmethyl)ether is preferred.

The preparation of compounds of the formula $$Li\theta R_1 OR_2 \theta Li$$

is more fully disclosed in the co-pending Fein et al. application Serial No. 269,839, filed March 28, 1963. Briefly, a bis(11-carboranylalkyl)ether is reacted with an organo-lithium compound, such as an alkyl-lithium compound, to produce a lithium derivative.

For example, $$H\theta R_1 OR_2 \theta H + 2RLi \rightarrow Li\theta R_1 OR_2 \theta Li + 2RH$$

wherein $R_1$ and $R_2$ suitably have from 1 to 4 carbon atoms, and preferably have 1 to 2 carbon atoms.

The preparation of bis(11-carboxy-12-carboranylalkyl)ethers is more fully described in the co-pending Fein et al. application Serial No. 269,839, filed March 28, 1963. As there disclosed, a bis(11-carboranylalkyl) ether is reacted with an organo lithium compound and the resulting 12-lithium substituted ether is reacted with carbon dioxide to form a lithium carboxylate salt which, pon hydrolysis, forms a bis(12-carboxy-11-carboranylalkyl)ether:

$$H\theta R_1 OR_2 \theta H + 2RLi \rightarrow Li\theta R_1 OR_2 \theta Li + 2RH$$
$$Li\theta R_1 OR_2 \theta Li + 2CO_2 \rightarrow LiO_2 C\theta R_1 OR_2 \theta CO_2 Li$$
$$LiO_2 C\theta R_1 OR_2 \theta CO_2 Li + 2H^+ \rightarrow HO_2 C\theta R_1 OR_2 \theta CO_2 H + Li^+$$

Bis(11-carboxy-12-carboranylalkyl)ethers may also be prepared according to the method disclosed in the co-pending Grafstein et al. application Serial No. 269,838, filed March 28, 1963. By this method, bis(11-carboranylalkyl)ethers are reacted with an organo-lithium compound, the resulting lithium-substituted ether is condensed with an oxyalkyl compound such as ethylene oxide to form a lithium alcoholate which, upon hydrolysis, forms a bis(11-carboxy-12-carboranylalkyl)ether:

$$H\theta R_1 OR_2 \theta H + 2RLi \rightarrow Li\theta R_1 OR_2 \theta Li + 2RH$$

$$Li\theta R_1 OR_2 \theta Li + 2H_2C\underset{O}{\overset{}{\diagdown\!\!\diagup}}CH_2 \longrightarrow$$
$$LiOCH_2 CH_2 \theta R_1 O R_2 \theta CH_2 CH_2 OL$$

$$LiOCH_2 CH_2 \theta R_1 OR_2 \theta CH_2 CH_2 OLi + 2H^+ \rightarrow$$
$$HOCH_2 CH_2 \theta R_1 OR_2 \theta CH_2 CH_2 OH + 2Li^+$$

In order to point out more fully the nature of the present invention, the following specific examples are given as illustrative embodiments of the present process and products produced thereby.

*Example I*

The lithium salt of bis(11-carboranylmethyl)ether was prepared according to methods taught in copending Grafstein et al. application Serial No. 269,838, filed March 28, 1963, by adding a mixture of 16.5 grams of bis(carboranylmethyl)ether in 250 ml. of ethyl ether to a slurry of 0.11 mole of butyllithium in 100 ml. of ethyl ether. This addition was carried out at −5° to +5° C. with stirring. After said addition, the reaction mix was allowed to come to room temperature. The ethyl ether was then removed by distillation. As this distillation proceeded, 300 ml. of benzene was added to the reaction mixture.

When the removal of ethyl ether was completed, the lithium salt was reacted according to the present invention by adding 3 grams of paraformaldehyde to the mix. The reactants were heated to 70° C. and maintained at that temperature for four hours. The reaction product was hydrolyzed by acidifying the reaction mixture with aqueous hydrochloric acid to form bis(12-hydromethyl-11-carboranylmethyl)ether.

After the acidification, the benzene was removed as a separate layer. A remaining material was extracted with ether and benzene-ether, washed with water, and dried. Residual solvents may be removed under vacuum, or the material may be purified by recrystallization from toluene. The total yield from the above-described procedure was 9.5 grams of bis(12-hydroxymethyl-11-carboranylmethyl) ether. The formula was confirmed by an analysis:

|  | B | C | H |
|---|---|---|---|
| Found | 54.45 | 25.56 | 7.99 |
| Calculated | 55.38 | 24.59 | 7.74 |

*Example II*

A solution of 10.45 grams of bis(11-carboxy-12-carboranylmethyl)ether in 150 ml. of ethyl ether was added to 2.37 grams of lithium aluminum hydride slurried in 125 ml. of ethyl ether. This addition was carried out over one hour at 30° C. When the addition was complete, the reaction mixture was refluxed for one hour. It was then cooled to 5° C., at which temperature it was acidified with 10% $H_2SO_4$. The ethyl ether layer was then separated, washed with water, and evaporated, leaving a solid residue. The solid residue was washed with dilute sodium hydroxide, washed with water, and then dried. The solid material resulting from the foregoing operation was recrystallized from toluene to yield 1.5 grams of bis(11-hydroxymethyl-12-carboranylmethyl) ether.

An infra-red analysis of the product indicated the systhesis of the indicated compound.

It is of course to be understood that the foregoing examples are intended to be illustrative and that numerous changes can be made in the ingredients, proportions, and conditions set forth therein without departing from the spirit of the invention as defined in the appended claims.

We claim:

1. A product of the formula $$HOCH_2 C_2 H_{10} B_{10} R_1 OR_2 C_2 H_{10} B_{10} CH_2 OH$$

wherein $R_1$ and $R_2$ are alkylene groups.

2. A product of the formula $$HOCH_2 C_2 H_{10} B_{10} R_1 OR_2 C_2 H_{10} B_{10} CH_2 OH$$

wherein $R_1$ and $R_2$ are alkyl groups having 1 to 4 carbon atoms.

3. A product of the formula $$(HOCH_2 C_2 H_{10} B_{10} R)_2 O$$

wherein R is an alkylene group having 1–4 carbon atoms.

4. A product of the formula $$(HOCH_2 C_2 H_{10} B_{10} CH_2)_2 O$$

5. A process which comprises reacting the dilithio salt of a bis(carboranylalkyl)ether with formaldehyde, and then hydrolyzing the product of said reaction to obtain a material of the formula $$HOCH_2 C_2 H_{10} B_{10} R_1 OR_2 C_2 H_{10} B_{10} CH_2 OH$$

where $R_1$ and $R_2$ are alkylene groups.

6. A process which comprises reacting a bis(11-carboxy-12-carboranylalkyl)ether with lithium aluminum hydride and then hydrolyzing the product of said reaction to obtain a material of the formula $$HOCH_2C_2H_{10}B_{10}R_1OR_2C_2H_{10}B_{10}CH_2OH$$

where $R_1$ and $R_2$ are alkyl groups.

7. A process which comprises reacting the dilithio salt of a bis(carboranylalkyl)ether with formaldehyde and then hydrolyzing the product of said reaction to obtain a material of the formula $$(HOCH_2C_2H_{10}B_{10}R)_2O$$

where R is an alkyl group.

8. A process which comprises reacting a bis(11-carboxy-12-carboranylalkyl)ether with lithium aluminum hydride and then hydrolyzing the product of said reaction to obtain a material of the formula $$(HOCH_2C_2H_{10}B_{10}R)_2O$$

where R is an alkylene group.

9. A process which comprises reacting the dilithio salt of bis(carboranylmethyl)ether with formaldehyde and then hydrolyzing the product of said reaction to obtain the material of the formula $$(HOCH_2C_2H_{10}B_{10}CH_2)_2O$$

10. A process which comprises reacting bis(11-carboxy-12-carboranylmethyl)ether with lithium aluminum hydride and then hydrolyzing the product of said reaction to obtain the material of the formula $$(HOCH_2C_2H_{10}B_{10}CH_2)_2O$$

No references cited.

TOBIAS E. LEVOW, *Primary Examiner.*

CARL D. QUARFORTH, REUBEN EPSTEIN,
*Examiners.*